United States Patent [19]
Fujita

[11] 4,367,512
[45] Jan. 4, 1983

[54] TRANSPORTABLE POWER SUPPLY SUBSTATION

[75] Inventor: Hideo Fujita, Atami, Japan
[73] Assignee: Kabushiki Kaisha Meidensha, Japan
[21] Appl. No.: 323,996
[22] Filed: Nov. 23, 1981

Related U.S. Application Data

[63] Continuation of Ser. No. 95,993, Nov. 26, 1979, abandoned.

[30] Foreign Application Priority Data

Nov. 24, 1978 [JP] Japan .................................. 53-162561

[51] Int. Cl.³ .......................... H02B 1/04; H02B 5/00
[52] U.S. Cl. .................................... 361/334; 361/333; 361/335
[58] Field of Search ................. 361/331–336, 361/340, 376; 307/113, 150; 200/48 R, 50 AA

[56] References Cited

U.S. PATENT DOCUMENTS

| | | | |
|---|---|---|---|
| 2,237,812 | 4/1941 | De Blieux | 361/333 |
| 2,551,841 | 5/1951 | Kepple | 361/333 |
| 3,457,462 | 7/1969 | Gargala | 361/334 |

OTHER PUBLICATIONS

Mechanique-Electricite, May 1959, pp. 379–281, "Sous-Stations Electriques Roulieres-Aux Etats-Unis".

Primary Examiner—G. P. Tolin
Attorney, Agent, or Firm—McGlew and Tuttle

[57] ABSTRACT

A transportable power supply substation is a power supplying equipment in which electric power machines are mounted on transporting apparatus. The transportable power supply substation in accordance with the present invention including transporting means and electric power distributing means which includes a transformer a current interrupting unit and so on, and the current interrupting unit is rotatably supported by supporting means which comprises a supporting shaft a bearing member and rollers. The current interrupting unit is therefore, rotatable as occasion demands, and is also secured to the transporting means by means of securing means.

8 Claims, 5 Drawing Figures of 5 to 15 KV to the present high level of 500 to 750 KV. A high voltage power supply substation is, accordingly, required in various places where the power source is needed.

TRANSPORTABLE POWER SUPPLY SUBSTATION

This is a continuation, of application Ser. No. 095,993 filed Nov. 26, 1979, now abandoned.

BACKGROUND OF THE INVENTION

The present invention relates to a power supply substation and, more particularly to a transportable power supply substation which is transportable to anywhere as occasion demands.

With the growth of the electrical power industry, transmission voltage has increased from modest values of 5 to 15 KV to the present high level of 500 to 750 KV. A high voltage power supply substation is, accordingly, required in various places where the power source is needed.

A transportable power supply substation very conveniently satisfies the above requirement. The transportable power supply substation is constituted by arranging various electrical machines required in electrical power transmission and distribution system on a trailer truck. Accordingly, the transportable power supply substation is transportable to any place where the power supply substation is needed. In addition, the transportable power supply substation is a power supplying equipment in which power supplying devices such as, for example, a transformer, an interrupter, a disconnecting switch unit and so on are mounted on the trailer truck. Accordingly, the transportable power supply substation is very conveniently used for various purposes and in various places, because it is very easy to set in place by the simple construction thereof. There are, however, serious and troublesome problems in case where a power supply substation is transported. Particularly, a current interrupter unit used for the high voltage is convenient to install and to transport, because it is large in size and heavy in weight. Specifically, the electrical power supplying machines such as the transformer, the current interrupter and a disconnecting switch unit are, in general, arranged on the trailer truck along with the length of the trailer truck. The electrical power machines must also be installed on the trailer truck spaced apart at a given distance from each of adjacent machines in order to maintain the insulation distance. The three-phase current interrupter must be mounted on the trailer truck so that its arranging direction is perpendicular to the length direction of the trailer truck to obtain the insulation distance from the other neighbouring machines. In this case, it is very inconvenient to transport, since the length of the three-phase current interrupter extends over the limit of transportation.

SUMMARY OF THE INVENTION

It is an object of the present invention is to provide a high voltage power supply substation which is transportable with security.

It is another object of the invention is to provide a high voltage power supply substation which can be restricted to the limit of transport in transporting and can be also maintain the insulation distance in use.

The present invention provides a transportable power supply substation comprising, substantially, transporting means for transporting a distributing equipment for use in supplying power, distributing means for distributing the electric power to an electrical load and a disconnecting switch unit for disconnecting the electrical load from a power supply line, a current interrupting unit for interrupting the current to be supplied to the electrical load from the power supply line, a transformer for transforming the voltage of the power supply line to the voltage to be applied to the load and a power board for distributing the electric power to a load, supporting means for rotatably supporting said current interrupting unit and securing means for securing the current interrupting unit on the transporting means.

The provision of rotatable supporting means for supporting the current interrupting unit of an apparatus according to the present invention overcomes the aforementioned experienced with the prior art apparatus and also makes it possible for the transporter to be easily positioned, a feature which is frequently required in practice.

Additional objects and advantages of the present invention will become apparent upon consideration of the following description when taken in conjunction with the accompanying drawings.

DESCRIPTION OF THE PREFERRED EMBODIMENT

Figure 1:
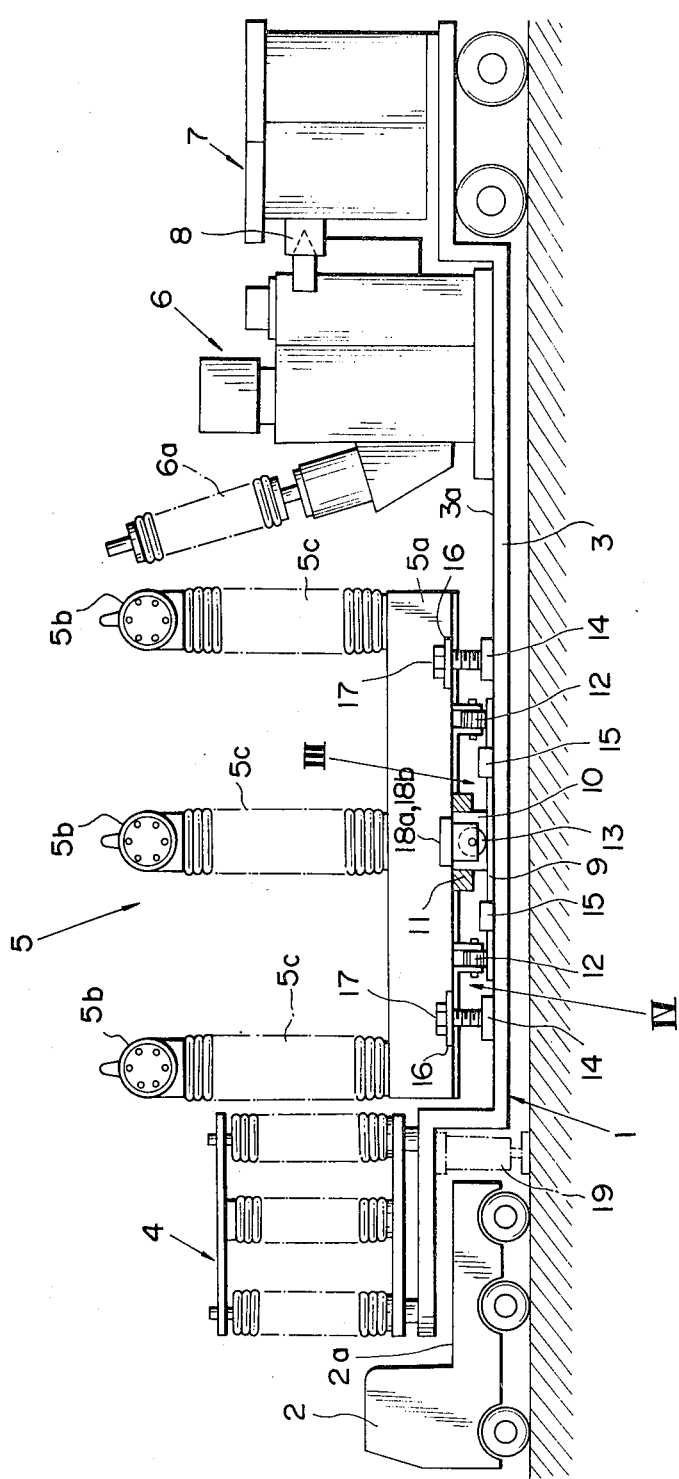
FIG. 1 is a elevational side view of a power supply substation according to the present invention.

Referring to the drawing and more particularly to FIG. 1, there is illustrated a transportable power supply substation in accordance with the present invention. As is shown in FIG. 1, the transportable power supply substation comprises transportable means in the form of a semi-trailer truck 1, electric power distributing means including a disconnecting switch unit 4 for disconnecting a bus bar of a power line from electrical equipment, a circuit breaker means including a current interrupting unit 5 for interrupting current which flows to a load from a power line, a transformer 6 and a power-board 7 each of which is mounted on the semi-trailer truck 1.

The semi-trailer truck 1 of the transporting means consists of a truck 2 and a trailer 3 which is interconnected to a truck flatted bed 2a. The disconnecting switch unit 4 is mounted and secured on the front portion of a trailer bed 3a of the trailer 3. The current interrupting unit in the form of a three-phase vacuum interrupter 5 is rotatably mounted on the intermediate portion of the trailer bed 3a. The transformer 6 and the power-board 7 are mounted and secured on the rear portion of the trailer bed 3a, and each of which is electrically and mechanically connected to each by means of connecting member 8.

In more detail, the interrupter unit 5 is rotatably supported by supporting means on the trailer bed 3a of the trailer 3 and is fixed to the trailer bed 3a by means of securing means.

Figure 2:
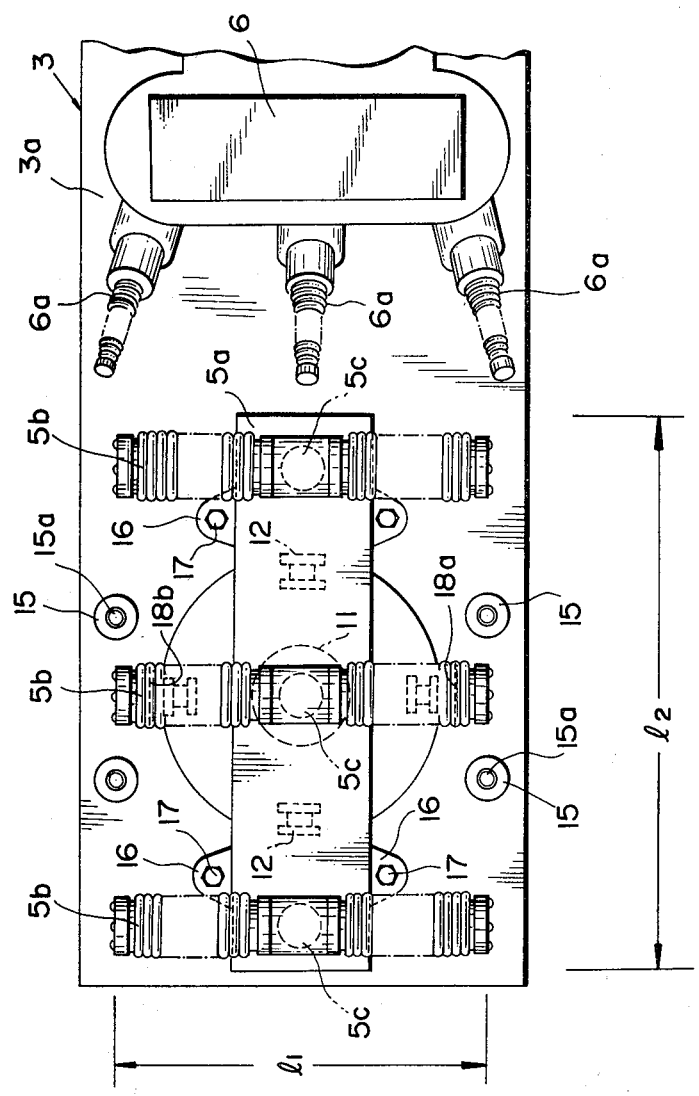
FIG. 2 is plan view showing the main portion of the transportable power supply substation in accordance with the present invention.

As is shown in FIGS. 1 and 2, the vacuum interrupter 5 comprises the operation unit 5a and three-phase current interrupting members 5b provided on the operation unit 5a by way of support members in the form of supporting insulators 5C spaced apart at a given distance from each.

Figure 3:
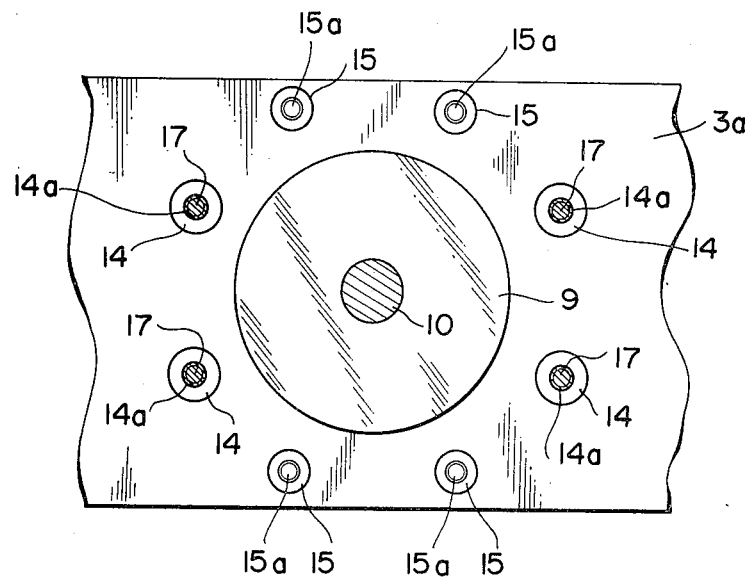
FIG. 3 is a plan view taken along with an arrow III of FIG. 1.

The supporting means includes, as is seen in FIGS. 1, and 3, a disc-shaped supporting table 9 which is provided on the center portion of the trailer bed 3a, a supporting shaft 10 which is provided in the center portion of the table 9, a bearing member 11 which is accommodated to the operation unit 5a of the vacuum interrupter 5 and a plurality of rollers 12 and 13 which are attached to the operation unit 5a of the vacuum interrupter 5. The securing means comprises a plurality of securing bushes 14 and 15 fastened to the trailer bed 3a of the trailer 3, a plurality of securing metals 18a and 18b fastened to the operation unit 5a of the vacuum interrupter 5, and a plurality of bolts 17 for use in fixing the vacuum interrupter 5 to the trailer bed 3a of the trailer 3.

As is best shown in FIG. 3, the disc-shaped supporting table 9 is secured on the center portion of the trailer bed 3a, and the supporting shaft 10 is provided on the center portion of the table 9 to form the supporting means. Two pairs of fixed bushes 14 having tapped holes 14a are provided symmetrically with respect to the center of the supporting shaft 10 and are located around the peripheral portion of the table 9. Further, two pairs of fixed bushes 15 having tapped holes 15a are also provided symmetrically with respect to the center of the supporting shaft 10 and are located at the peripheral portion of the table 9 to form the securing means.

Figure 4:
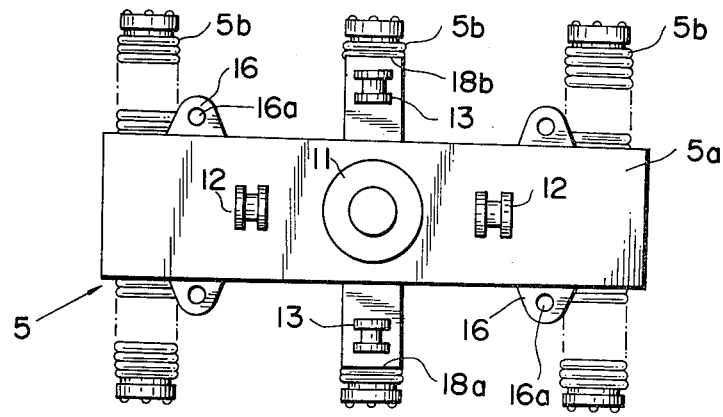
FIG. 4 is a bottom view viewed from an arrow IV of FIG. 1.

As is shown in FIG. 4, the bearing member 11, having a fitting hole 11a, is provided in the lower surface of the operation unit 5a of the interrupter 5 and is located at the center portion of the lower surface of the operation unit 5a to form the rotary means. The pair of rollers 12 are provided symmetrically with respect to the bearing member 11 in the lower surface of the operation unit 5a to form the rotary and supporting means. A pair of supporting plates 18a and 18b are fixed to side-wall of the operation unit 5a of the interrupter 5. One roller 13 is mounted on the supporting plate 18a, and the other roller 13 is mounted on the supporting plate 18b to form a side bearer. Each of the rollers 12 and 13 is located on a circular line so as to be situated on the table 9. Two pair of fixing plates 16 having fixing holes 16a are secured on the side-walls of the operation unit 5a of the interrupter 5 so as to be located to the corresponding position of the fixed bushes 14. The operation unit 5a of the interrupter 5 is secured to the trailer bed 3a of the trailer 3 by fastening the fixing plates to the fixed bushes 14 by means of fixing bolts 17.

Although the rotatable supporting member is comprised by the disc table 9 provided on the trailer bed 3a of the trailer 3, the supporting shaft 10 secured to the table 9, the thrust bearing member 11 provided on the operation unit 5a of the current interrupting unit 5 and the rollers 12 and 13 which are provided on the operation unit 5a in the above described embodiment, a turntable can be also provided on the trailer bed 3a of the trailer 3 to mount and secure the current interrupting unit 5 in the present invention.

In accordance with the transportable power supply substation, constructed as described above, the interrupter unit 5 is secured, during transport, to the trailer bed 3a by securing means so as to be arranged along with the length of the trailer 3, as is shown in FIGS. 1 and 2. The secured interrupter unit 5 is supported by the supporting means which comprises the supporting table 9 fixed to the trailer bed 3a, the supporting shaft 10 provided on the center portion of the table 9 so as to project upper ward from the table 9, the bearing member 11 provided in the center portion of the lower surface of the operation unit 5a by fitting with the supporting table 9 and rollers 12 and 13. As is shown in FIG. 2, a dimension $l_1$ of the width smaller than a dimension $l_2$ of the length of in the high voltage three-phase interrupting unit 5. Accordingly, the interrupter unit 5 can be laid within the boundary of transportation.

Figure 5:
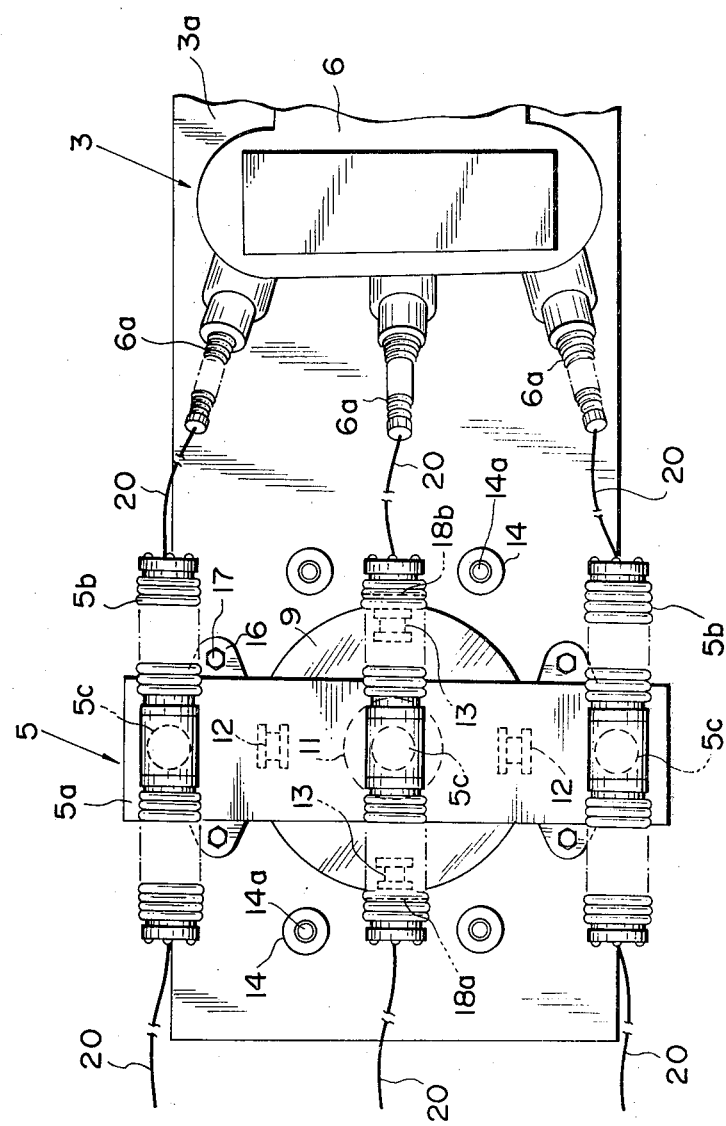
FIG. 5 is a plan view of the main portion of the transportable power supply substation in accordance with the present invention and showing the location of a current interrupting unit in transport.

In the actual use of the power suply substation, the fixing bolts 17 are taken off from the fixed bushes 14a and 14b. After the fixing bolts 17 are unfastened, the interrupting unit 5 is placed in the position of FIG. 5, by manually rotating it for 90 degrees angle, as seen in FIG. 5. Thereafter, the interrupting unit 5 is fixed to the trailer bed 3a of the trailer 3 by fastening the fixing bolts 17 to the fixed bushes 15 as is shown in FIG. 5.

Under the condition that the interrupting unit 5 is fixed in the state shown in FIG. 5, the insulation distance is fully obtained from the neighbouring electrical devices. Moreover, each of the interrupting members 5b is electrically connected to each phase terminal 6a by a lead 20 and each phase terminal of the disconnecting member 4 is electrically connected to the each terminal of the interrupting member 5b. The trailer 3 of the trailer truck 1 is supported by a fixing device in the form of a screw jack 19.

As is apparent from the foregoing, in accordance with the present invention, as the interrupting unit is rotatably mounted on the transporting means by the supporting means, it is easy to change the mounting direction of the current interrupting unit 5 as occasion demands. Accordingly, the power supply substation can be transported with security and may be set within the limit of transportation. Since the current interrupting unit is rotatably supported by the supporting means comprising a bearing member, a pair of rollers provided on the lower surface of the operation unit and the other pair of rollers provided on the side-bearer, the current interrupting unit can be located easily by means of the manual force so that the insulation distance between the adjacent electric machines can be obtained by rotating the current interrupting unit so as to be directed toward the width direction of the transporting device. 1

While the preferred embodiment of invention has been particularly shown and described, it will be apparent to those skilled in the art that modifications can be made without departing from the principle and spirit of the invention, the scope of which defined in the appended claims. Accordingly, the foregoing embodiment is to be considered illustrative, rather than restricting of the invention and the modification which come within the meaning and range of equivalent of the claims are to be included herein.

What is claimed is:

1. A transportable power supply substation comprising transporting means for transporting a distributing equipment for use in power supplying, said transporting means comprising a truck and a trailer truck interconnected to said truck, distributing means for distributing electric power to a load, said distributing means including a disconnecting switch unit mounted and secured on said trailer truck for disconnecting said electrical load from a power supply line, a current interrupting unit for interrupting the current to be supplied to said electrical load from the power supply line, a transformer mounted and secured on said trailer truck for transforming the voltage to be applied to the load, a power board mounted and secured on said trailer truck for distributing the electric power to the load, supporting means rotatably supporting said current interrupting unit for movement in a horizontal direction on said trailer truck, and securing means securing said current interrupting unit on said trailer truck, said supporting means includes at least one pair of rollers provided on the lower surface of said current interrupting unit symmetrically with respect to a center portion of said lower surface, and a pair of side bearer elements including a pair of arm plates fastened to the lower side walls of said current interrupting unit and a second pair of rollers, each roller of said second pair of rollers being provided in lower surface of one of said arm plates.

2. A transportable power supply substation as set forth in claim 1, wherein said securing means comprises a securing member securing said current interrupting unit to said trailer truck and said securing means being provided on said trailer truck and said current interrupting unit.

3. A transportable power supply substation as claimed in claim 2, wherein said trailer truck includes a trailer bed, said disconnecting switch unit is secured to said trailer bed of said trailer truck, said supporting means further comprising a supporting member for rotatably supporting said current interrupting unit on said trailer bed, and said supporting means further comprising a securing member for securing said current interrupting unit on said trailer bed.

4. A transportable power supply substation as set forth in claim 2, wherein said securing member comprises a plurality of fixing bushes fixed on said trailer bed, a plurality of fixing plates fastened to said current interrupting unit and a plurality of bolts fastening said fixing metal plate to said fixing bushes.

5. A transportable power supply substation as set forth in claim 2, wherein said supporting member comprises a disc secured to the center portion of said trailer bed, a supporting shaft secured to the center portion of said disc table and projecting in an upward direction from a surface of said disc table, a thrust bearing coupled to said supporting shaft and mounted on the center portion of said current interrupting unit, and said at least one pair of rollers provided on the lower surface of said current interrupting unit symmetrically with respect to said thrust bearing.

6. A transportable power supply substation as claimed in claim 2, wherein said supporting member comprises a disc table secured to said trailer bed, said securing member comprises a first pair of fixing bushes having screwed holes and fixed to the trailer bed of the trailer truck spaced apart at a given distance from each and located symmetrically with respect to said disc table along with the length of said trailer truck, a second pair of fixing bushes having screwed holes and fixed to the trailer bed of the trailer truck spaced apart at a given distance and heated symmetrically with respect to said disc table along with the width direction of said trailer truck, and a plurality of fixing plates fastened to said current interrupting unit, and a plurality of bolts for screwably fixing said current interrupting unit to said trailer bed for screwing said fixing bushes by way of said fixing plates.

7. A transportable power supply substation as claimed in claim 6, wherein said current interrupting unit is a three-phase vacuum interrupter.

8. A transportable power supply substation comprising transporting means for transporting a distributing equipment for use in power supplying, said transporting means comprising a truck and a trailer truck interconnected to said truck, distributing means for distributing electric power to a load, said distributing means including a disconnecting switch unit mounted and secured on said trailer truck for disconnecting said electrical load from a power supply line, a current interrupting unit for interrupting the current to be supplied to said electrical load from the power supply line, a transformer mounted and secured on said trailer truck for transforming the voltage to be applied to the load, a power board mounted and secured on said trailer truck for distributing the electric power to the load, supporting means rotatably supporting said current interrupting unit for movement in a horizontal direction on said trailer truck, and securing means securing said current interrupting unit on said trailer truck, said supporting means comprises a supporting member for rotatably supporting said current interrupting unit of said distributing means, and said supporting means being mounted on said trailer truck of the transporting means and said current interrupting unit, wherein said trailer truck includes a trailer bed, said disconnecting switch unit is secured to said trailer bed of said trailer truck, said supporting means further comprising a supporting member for rotatably supporting said current interrupting unit on said trailer bed, and wherein said supporting member comprises a disc table secured to said trailer truck bed of said trailer, a supporting shaft secured to the center portion of said disc table, a bearing member mounted on said current interrupting unit and a plurality of rollers mounted to said current interrupting unit.

* * * * *